(12) United States Patent
Blanchflower et al.

(10) Patent No.: US 9,235,913 B2
(45) Date of Patent: Jan. 12, 2016

(54) METHODS AND SYSTEMS FOR GENERATING AND JOINING SHARED EXPERIENCE

(71) Applicant: LONGSAND LIMITED, Cambridge (GB)

(72) Inventors: Sean Blanchflower, Cambridge (GB); Simon Hayhurst, Palo Alto, CA (US)

(73) Assignee: Aurasma Limited, Bracknell (GB)

(*) Notice: Subject to any disclaimer, the term of this patent is extended or adjusted under 35 U.S.C. 154(b) by 0 days.

(21) Appl. No.: 13/947,943

(22) Filed: Jul. 22, 2013

(65) Prior Publication Data

US 2013/0307874 A1 Nov. 21, 2013

Related U.S. Application Data

(63) Continuation of application No. 13/086,358, filed on Apr. 13, 2011, now Pat. No. 8,493,353.

(51) Int. Cl.
*H04L 5/00* (2006.01)
*G06T 11/60* (2006.01)
*G06F 17/30* (2006.01)
*H04L 29/06* (2006.01)

(52) U.S. Cl.
CPC .......... *G06T 11/60* (2013.01); *G06F 17/30247* (2013.01); *H04L 67/38* (2013.01)

(58) Field of Classification Search
CPC ...... H04N 5/232; H04N 5/2352; H04N 5/243
See application file for complete search history.

(56) References Cited

U.S. PATENT DOCUMENTS 6,272,231 B1 * 8/2001 Maurer et al. ............... 382/103
6,400,374 B2 6/2002 Lanier
6,563,960 B1 5/2003 Ong et al.
(Continued)

FOREIGN PATENT DOCUMENTS

CN 101189049 5/2008
CN 102696223 9/2012
(Continued)

OTHER PUBLICATIONS

Autonomy press release, "Thrasher Magazine and Aurasma Launch Comprehensive Augmented Reality Promotion for SXSW and Beyond", http://www.autonomy.com/content/News/Releases/2012/0313.en.html, Mar. 13, 2012, 2 pages.
(Continued)

Primary Examiner — Fan Ng
(74) Attorney, Agent, or Firm — Mannava & Kang, P.C.

(57) ABSTRACT

According to an example, a computer may receive characteristics information of an object in a video stream captured by a first computing device, generate a signature based on the characteristics information, identify an augmented reality information associated with the signature, transmit the augmented reality information to the first computing device, receive, from a second computing device, a set of characteristics information of the object in an image captured by the second computing device, determine that the set of characteristics information from the second computing device has a second signature that matches the signature generated based on the characteristics information received form the first computing device, and transmit the identified augmented reality information to the second computing device.

14 Claims, 12 Drawing Sheets

(56) References Cited

U.S. PATENT DOCUMENTS

| | | | |
|---|---|---|---|
| 6,714,661 | B2 | 3/2004 | Buddenmeier et al. |
| 6,845,338 | B1 | 1/2005 | Willins et al. |
| 6,906,643 | B2 | 6/2005 | Samadani et al. |
| 7,050,787 | B2 | 5/2006 | Caci |
| 7,084,809 | B2 | 8/2006 | Hockley et al. |
| 7,177,651 | B1 | 2/2007 | Almassy |
| 7,389,526 | B1 | 6/2008 | Chang et al. |
| 7,471,301 | B2 * | 12/2008 | Lefevre .......................... 345/632 |
| 7,512,900 | B2 | 3/2009 | Lynch et al. |
| 7,565,139 | B2 * | 7/2009 | Neven et al. ................ 455/414.3 |
| 7,693,702 | B1 | 4/2010 | Kerner et al. |
| 8,005,958 | B2 | 8/2011 | Hannel et al. |
| 8,010,327 | B2 | 8/2011 | Copenhagen et al. |
| 8,160,980 | B2 | 4/2012 | Da Silva Fernandes et al. |
| 8,226,011 | B2 | 7/2012 | Merkli et al. |
| 8,229,743 | B2 | 7/2012 | Carter et al. |
| 8,400,548 | B2 * | 3/2013 | Bilbrey et al. ........... 348/333.01 |
| 8,704,854 | B2 | 4/2014 | Gharaat et al. |
| 2004/0258311 | A1 | 12/2004 | Barbehoen et al. |
| 2005/0024387 | A1 | 2/2005 | Ratnakar et al. |
| 2005/0055281 | A1 | 3/2005 | Williams |
| 2005/0227674 | A1 | 10/2005 | Kopra et al. |
| 2006/0218191 | A1 | 9/2006 | Gopalakrishnan |
| 2006/0227992 | A1 | 10/2006 | Rathus et al. |
| 2006/0284791 | A1 | 12/2006 | Chen et al. |
| 2007/0161383 | A1 | 7/2007 | Caci |
| 2008/0077952 | A1 | 3/2008 | St. Jean et al. |
| 2008/0165843 | A1 | 7/2008 | Dvir et al. |
| 2008/0188246 | A1 | 8/2008 | Sheha et al. |
| 2008/0194323 | A1 | 8/2008 | Merkli et al. |
| 2008/0214153 | A1 | 9/2008 | Ramer et al. |
| 2008/0268870 | A1 | 10/2008 | Houri |
| 2008/0268876 | A1 | 10/2008 | Gelfand et al. |
| 2009/0061901 | A1 | 3/2009 | Arrasvuori et al. |
| 2009/0070797 | A1 | 3/2009 | Ramaswamy et al. |
| 2009/0102859 | A1 | 4/2009 | Athsani et al. |
| 2009/0176520 | A1 | 7/2009 | B.S. et al. |
| 2009/0232354 | A1 | 9/2009 | Camp, Jr. et al. |
| 2009/0233629 | A1 | 9/2009 | Jayanthi |
| 2009/0276154 | A1 | 11/2009 | Subramanian et al. |
| 2009/0307091 | A1 | 12/2009 | Lilley |
| 2010/0060632 | A1 | 3/2010 | Lefevre et al. |
| 2010/0081458 | A1 | 4/2010 | Sheynblat et al. |
| 2010/0103241 | A1 | 4/2010 | Linaker et al. |
| 2010/0107185 | A1 | 4/2010 | Shintani |
| 2010/0115114 | A1 | 5/2010 | Headley |
| 2010/0220891 | A1 | 9/2010 | Lefevre et al. |
| 2010/0257052 | A1 | 10/2010 | Zito et al. |
| 2010/0281156 | A1 | 11/2010 | Kies et al. |
| 2010/0309225 | A1 | 12/2010 | Gray et al. |
| 2010/0325126 | A1 | 12/2010 | Rajaram et al. |
| 2011/0063317 | A1 | 3/2011 | Gharaat et al. |
| 2011/0164163 | A1 | 7/2011 | Bilbrey et al. |
| 2011/0199479 | A1 | 8/2011 | Waldman |
| 2011/0210959 | A1 | 9/2011 | Howard et al. |
| 2011/0223931 | A1 | 9/2011 | Buer et al. |
| 2011/0289098 | A1 | 11/2011 | Oztaskent et al. |
| 2012/0025977 | A1 | 2/2012 | Schantz et al. |
| 2012/0069795 | A1 * | 3/2012 | Chung et al. .................. 370/315 |
| 2012/0254333 | A1 * | 10/2012 | Chandramouli et al. ..... 709/206 |
| 2012/0265328 | A1 | 10/2012 | Kadirkamanathan |

FOREIGN PATENT DOCUMENTS

| | | |
|---|---|---|
| EP | 1503344 | 2/2005 |
| GB | 2436924 | 10/2007 |
| WO | WO-2010141260 | 12/2010 |
| WO | WO-2011032168 | 3/2011 |
| WO | WO-2012/109182 | 8/2012 |
| WO | WO-2012/142332 | 10/2012 |
| WO | WO-2012/142333 | 10/2012 |

OTHER PUBLICATIONS

Business Wire News, "Auditude Announces Launch of Crosspoint Media Online Video Network Focused on Television Content", http://www.businesswire.com/news/home/20101027005366/en/Auditude-Announces-Launch-Crosspoint-Media-Online-Video, Oct. 27, 2010, 2 pages.

Cellan-Jones, Rory, "Aurasma: Augmented reality future or forgettable fun?", BBC Technology News, May 26, 2011, 5 pages.

Total Immersion Blog Article, "Total Immersion to Unveil First Commercial Markerless Tracking on Mobile at International CTIA Wireless 2010 in Las Vegas", http://blog.t-immersion.com/2010/03/23/total-immersion-to-unveil-first-commercialmarkerless-tracking-on-mobile-at-international-ctia-wireless-2010-in-las-vegas/, Mar. 23, 2010, 2 pages.

Marks, Paul, "Aurasma APP is Augmented Reality, Augmented", newscientist.com, http://www.newscientist.com/blogs/onepercent/2011/05/how-the-reverend-bayes-will-fi.html, May 20, 2011, 5 pages.

Google Mobile Blog Article, "Open your eyes: Google Goggles now available on iPhone in Google Mobile App", http://googlemobile.blogspot.com/2010/10/openyour-eyes-google-goggles-now.html, Oct. 5, 2010, 8 pages.

McCarty, Brad, "IntoNow: A TV Check-in Service That Hears What You're Watching", Thenextweb.com Article, http://thenextweb.com/apps/2011/01/31/intonow-a-tv-check-in-service-that-hears-what-youre-watching/, Jan. 31, 2011, 3 pages.

Search Report and Written Opinion for International Application No. PCT/US12/24063 mailed May 25, 2012, 8 pages. International Searching Authority/US, Alexandria, Virginia, USA.

Search Report and Written Opinion for International Application No. PCT/US12/33390 mailed Jun. 28, 2012, 9 pages. International Searching Authority/US, Alexandria, Virginia, USA.

Search Report and Written Opinion for International Patent Application No. PCT/US12/33389 dated Jun. 28, 2012, 8 pages.

* cited by examiner

METHODS AND SYSTEMS FOR GENERATING AND JOINING SHARED EXPERIENCE

CLAIM FOR PRIORITY

This application is a continuation application of commonly assigned and copending U.S. patent application Ser. No. 13/086,358, filed on Apr. 13, 2011, the disclosure of which is hereby incorporated by reference in its entirety.

FIELD

Embodiments of the present invention generally relate to the field of data processing, and in some embodiments, specifically relate to enable multiple users to share an augmented reality.

BACKGROUND

Smart mobile devices are becoming more common and sophisticated allowing users to establish and maintain connection to the Internet virtually from anywhere. The users can browse web sites and access their services. Two users in different geographical locations can access the same web site and be able to view and use the same services that the site offers. Each user independently controls what page to visit and how long to stay on a particular page. If the site is a movie or video site (e.g., YouTube), each user may independently control what video to watch, etc.

SUMMARY

A system comprises a trigger server configured to receive characteristics information from first and second mobile computing devices using wireless communication. The first and second mobile computing devices are located in close proximity to one another. The trigger server is further configured to generate signature information based on the characteristics information received from the first and second mobile computing devices, the characteristics information associated with a trigger. Each of the first and second mobile computing devices is configured with a built-in video camera to capture an image of the trigger. The trigger server is coupled with a trigger database configured to store information about a plurality of triggers. An augmented reality server is coupled with the trigger server and configured to use the signature information to identify an augmented reality. The augmented reality server is coupled with an augmented reality database configured to store information about a plurality of augmented realities, wherein the same identified augmented reality is to be transmitted to the first mobile computing device and the second mobile computing device, and wherein a user of the first mobile computing device shares the identified augmented reality with a user of the second mobile computing device by viewing the identified augmented reality on a display screen of the first mobile computing device while the second user views the identified augmented reality on a display screen of the second mobile computing device.

BRIEF DESCRIPTION OF THE DRAWINGS

The multiple drawings refer to the embodiments of the invention. While embodiments of the invention described herein is subject to various modifications and alternative forms, specific embodiments thereof have been shown by way of example in the drawings and will herein be described in detail.

DETAILED DESCRIPTION

Figure 1:
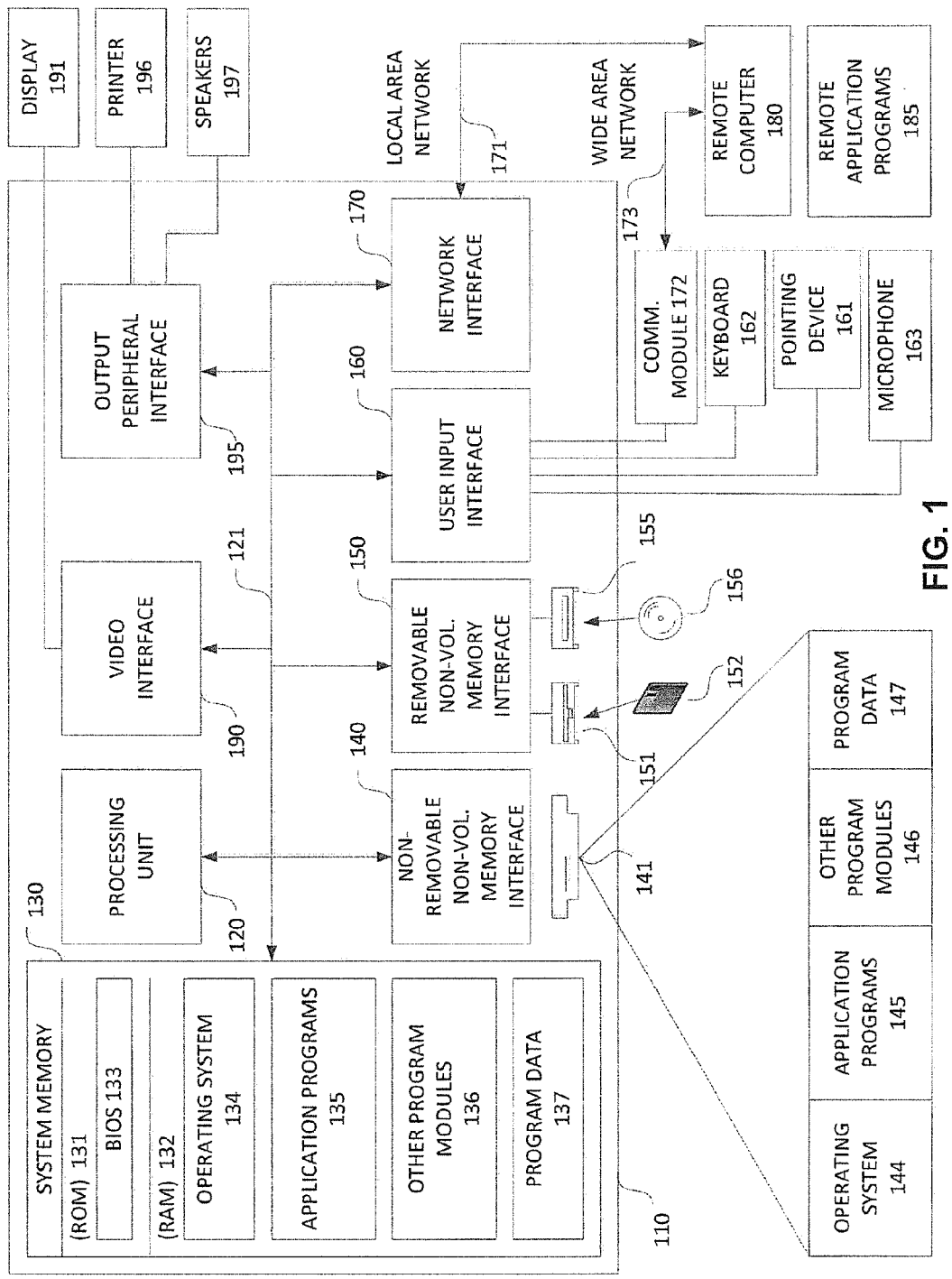
FIG. 1 illustrates a block diagram of an example computing system that may use an embodiment of one or more of the software applications discussed herein.

For some embodiments, a system that enables a user of a mobile computing device to share an augmented reality with users of other mobile computing devices based on a trigger and associated background information is disclosed. Each of the mobile computing devices includes a processor, a memory, a built in battery to power the mobile computing device, a built-in video camera configured to capture an image or a video stream that includes an image of the trigger, a display screen to display the augmented reality, and built-in wireless circuitry to wirelessly connect to a network and communicate with a server computing device. Each of the mobile computing devices also includes an image processing module coupled with the video camera and configured to analyze the trigger to form characteristics information. The image processing module is also configured to cause transmission of the characteristics information to the server computing device for processing, and to receive the augmented reality from the server computing device as a result. The image processing module is configured to overlay a bounding area on the display screen of the mobile computing device with the augmented reality. The bounding area is formed based on a shape of the trigger. The bounding area may be rectangle, circular, or it may be determined based on how the trigger objects are positioned relative from one another. All of the users enjoy the augmented reality as it is presented on the display screen of their own mobile computing devices while the users are locating in the same geographical area. Additional users may join at a subsequent time and enjoy the same augmented reality by using their mobile computing devices and capturing an image or a video stream that includes an image of the trigger.

In the following description, numerous specific details are set forth, such as examples of specific data signals, components, connections, etc. in order to provide a thorough understanding of the present invention. It will be apparent, however, to one skilled in the art that the present invention may be practiced without these specific details. In other instances, well known components or methods have not been described in detail but rather in block diagrams in order to avoid unnecessarily obscuring the present invention. Thus, the specific details set forth are merely exemplary. The specific details may be varied from and still be contemplated to be within the spirit and scope of the present invention.

In the following description of exemplary embodiments, reference is made to the accompanying drawings that form a part hereof, and in which it is shown by way of illustration specific embodiments in which the invention can be practiced. It is to be understood that other embodiments can be used and structural changes can be made without departing from the scope of the embodiments of this invention. As used herein, the terms "couple," "connect," and "attach" are interchangeable and include various forms of connecting one part to another either directly or indirectly. Also, it should be appreciated that one or more structural features described in one embodiment could be implemented in a different embodiment, even if not specifically mentioned as being a feature thereof.

Overview

Being able to share an experience may include being able to allow a group of users to view, hear or be involved in the experience that one user is going through. The sharing approach needs to be casual and quick such that a first user can share the experience with a second user without requiring the second user to create explicit information, groups, sign-on, etc. Much like the real world, if a user happens to be at a location then an experience or an event that is happening at that location can be shared if the user wants to join. Following is a simple example of a real life shared experience between two persons. A first user may be watching a sport program on a television set in a sport bar. The first user may be sitting at a table located at one corner of the sport bar with one orientation or angle of the television set. The second user may enter the sport bar at a later time and casually joins the first user watching the same sport program while sitting at a different table with a different orientation of the television set. Both users share the same experience since they view the same sport program simultaneously in the same environment even though they view the same television set from different tables or areas of the same sport bar. Note that this is different from a situation where the second user views a recorded version of the same sport program at a different time, or when the second user views the same sport program at the same time but at a different location.

As will be described, some embodiments of the present invention enable two or more users to use triggers associated with an event or a program and to casually share the experience of enjoying the program using the display screens of their mobile computing devices. Applying this concept to the sport bar example above, a first user may set up an arrangement of trigger objects on a table in a sport bar that does not have any television set. The trigger objects have been previously defined to correspond to the sport program. The first user then captures an image or a video stream that includes an image of the trigger objects with a video camera of a mobile computing device of the first user. The sport program may be automatically displayed on a portion of the display screen of the mobile computing device of the first user. While the first user is enjoying the sport program at one table, a second user may walk into the sport bar and capture an image or a video stream that includes an image of the same trigger objects with a mobile computing device of the second user. This enables the second user to view the same sport program as the first user but on the display screen of the mobile computing device of the second user. That is, the presentation of the sport program is time synchronized on both mobile computing devices. This is similar to the second user watching the sport program on the television set at a table different from the table used by the first user.

A shared experience implemented using computing devices as described in this example may also be referred to as an augmented reality. In addition, an arrangement of one or more trigger objects may be referred to as a trigger. Further, a video camera of the mobile computing device may be used to capture an image of the trigger or a video stream that includes an image of the trigger in one or more frames. As such, an image of the trigger described herein may be associated with a single image or a video stream.

In an embodiment, a computer-generated method is configured to generate a shared experience of augmented reality on a display of each participant's mobile computing device. An application identifies visual characteristics information of one or more trigger objects and the background scene around the trigger objects, which are captured in the frames of a video stream being recorded on the mobile computing device with its built in video camera application. The application transmits the characteristics information of the trigger objects and the background, as well as geographical information of the location of the trigger objects over to a server connected to a network using wireless communication. The application may generate a visual signature composed of the visual characteristics information of the trigger objects and background. A server may send one or many augmented reality scenarios to the application to display on the display screen and allow the user of the mobile computing device to select a given augmented reality scenario to become a part of. The application upon receiving a selection of an augmented reality scenario from the user communicates to the server. The server then sends the augmented reality scenario to overlay the scenario over the trigger objects and background included in the frames of the video stream. The server also receives a second set of visual characteristics information from the video stream of a second mobile device, which may have a matching visual signature. The applications on the mobile devices and the central server enable the augmented video stream with the augmented reality scenario to be viewable on a first display screen of the first mobile computing device and a second display screen of the second mobile computing device based on both mobile devices wirelessly sending up the same visual signature to a server. The augmented reality scenario is time synchronized on both the first and second display to be showing the same augmented reality scenario at the period of time within that augmented reality scenario on both the first and second display. The first and second mobile devices are merely an example number of devices and the system works for all of the mobile devices connecting to the server.

Trigger Objects

Figure 3A:
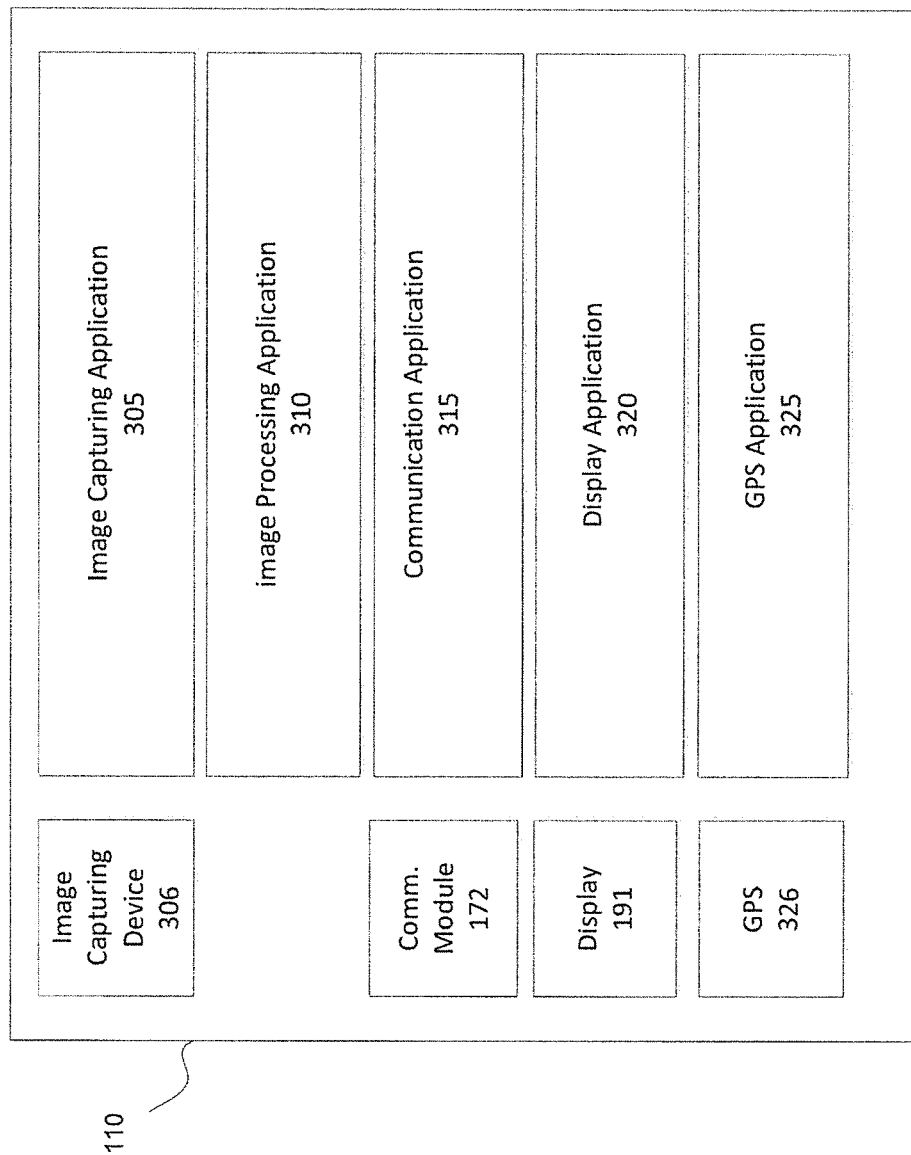
FIG. 3A is a block diagram that illustrates an example of applications that may be included in a mobile computing device, in accordance with some embodiments of the invention.

FIG. 3A is a block diagram that illustrates an example of applications that may be included in a mobile computing device, in accordance with some embodiments of the invention. The mobile computing device 110 illustrated in FIG. 1 may be configured with various applications. Some of these applications may include image capturing application 305, image processing application 310, communication application 315 and display application 320. The image capturing application 305 is coupled with image capturing device 306 to enable capturing and storing images or video streams that include images of the triggers. The image processing application 310 may be configured to analyze the images or the video streams that include the images of the triggers and generate characteristics information of the triggers. For example, the image processing application 310 may identify and extract distinctive features including shapes, dot-to-dot type X-Y coordinates of the shapes, patterns colors, letters numbers, symbols, etc. associated with trigger objects. This may help keeping the size of the file being transmitted to the server computing device small and hasten the near real time conversion of the characteristic information into signatures, the matching of the signatures with the stored augmented realities, the transmission of the appropriate augmented realities to the mobile computing devices, and the display of the augmented realities on the display screens of the mobile computing devices. For some embodiments, the mobile computing device 110 may also include global position system (GPS) application 325 coupled with the GPS device 326 and configured to generate GPS information that may be included in the image or video stream captured by the image capturing application 305. The GPS information may be used by the server computing device to determine the proximity of a group of users that may be associated with the same augmented reality. That is, the GPS information is useful in recognizing that a group of users may be located in the same location.

Figure 3B:
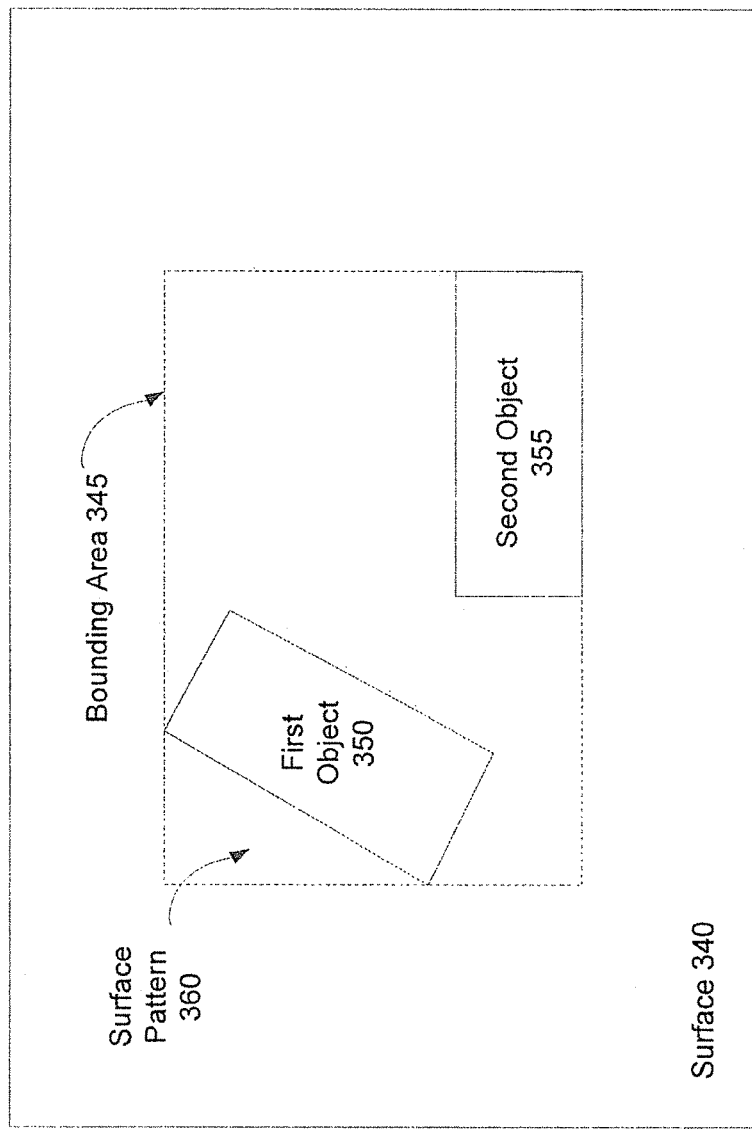
FIG. 3B illustrates one example of a trigger that may be used, in accordance with some embodiments of the invention.

FIG. 3B illustrates one example of a trigger that may be used, in accordance with some embodiments. The triggers may come in any form or shape. For example, a trigger may be a poster, an arrangement of elements, etc. A trigger may include one or more trigger objects. A trigger may be specifically designed to be unique, or it may be formed using a combination of a plurality of ordinary objects as trigger objects. The various arrangements, orientations, and patterns of the plurality of objects together with the associated background information, and the positioning or GPS information may result in a plurality of unique triggers. For example, using a scale variant, the uniqueness of the trigger may be determined based on the distance between two centroids of two trigger objects as a percentage of width of the trigger objects and the angle between the two longitudinal axes. A trigger may also be a well-known object such as, for example, a can of coke. This may be useful for presenting promotional information to the users. For example, after using a mobile computing device to capture an image/video stream of a can of coke, a video about a coke special program is presented on the display screen of the mobile computing device. Slight variations of a trigger may be used to represent different players in a game. For example, a dollar bill may be used as a trigger for a chess game; a dollar bill with a quarter on top may be used as a trigger for a first player in a chess game; a dollar bill with a nickel on top may be used as a trigger for a second player in the same chess game.

For some embodiments, each trigger may be previously defined to correspond to an augmented reality that may be presented on a display screen of a mobile computing device. The augmented reality may be related an event, a video, an audio, or any form of multimedia that can be presented on a display screen of a mobile computing device. In the current example, the trigger includes an arrangement of the first trigger object 350 and the second trigger object 355, placed at an angle from one another. Each of the first and second trigger objects 350, 355 may be a dollar bill placed on surface 340. The two trigger objects 350, 355 together form a bounding area 345 which may be a rectangle formed by extending from the edges and/or corners of the trigger objects 350 and 355. In general, the bounding area may be formed based on a shape of the trigger, based on how the trigger objects are positioned relative from one another, or based on a predetermined formula. For some embodiments, the bounding area 345 as formed by the trigger objects 350, 355 and captured by the video camera is used to present the augmented reality to the user of the mobile computing device. As such, the augmented reality may be said to overlay or to be positioned within the bounding area 345. The presentation of the augmented reality may be performed by the display application 320 (illustrated in FIG. 3A). When the surface 340 includes a surface pattern 360, the bounding area 345 may also include the surface pattern 360. This surface pattern 360 may be part of the trigger and may be useful to distinguish the arrangement of the trigger objects 350, 355 in this example from another similar arrangement of the two trigger objects 350, 355 on a surface that has a different surface pattern. It may be noted that when the surface pattern is used as part of the trigger and the surface patterns used for two triggers are plain or closely resemble one another, there may be a risk of cross-experience pollution since it may be difficult for the server computing device to distinguish.

Figure 3C:
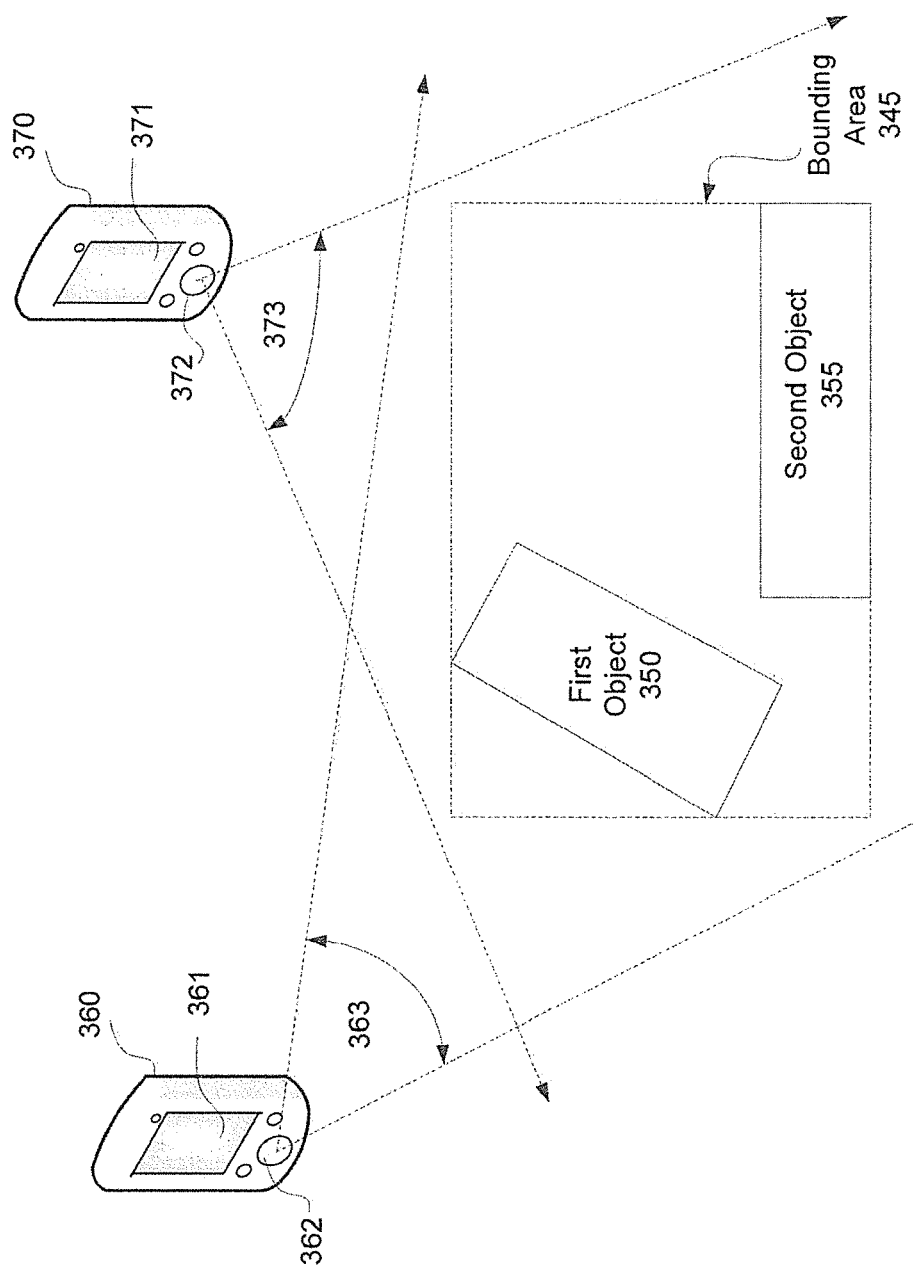
FIG. 3C illustrates an example of two mobile computing devices participating in an augmented reality, in accordance with some embodiments.

FIG. 3C illustrates an example of two mobile computing devices participating in an augmented reality, in accordance with some embodiments. Mobile computing device 360 includes a display screen 361 and a video camera 362. In this example, the mobile computing device 360 is operated by a first user and is positioned such that the video camera 362 captures an image or a video stream that includes an image of a trigger formed by the first and second trigger objects 350, 355 at angle or orientation 363. This may enable a user using the mobile computing device 360 to initiate an augmented reality and to enjoy that augmented reality on the display screen 361. At a subsequent time, a second user using the mobile computing device 370 can also capture an image or a video stream that includes an image of the trigger formed by the first and second trigger objects 350, 355 using the video camera 372 at angle or orientation 373. This may enable the second user to join the first user and share the same time synchronized augmented reality by using the display screen 371. It may be noted that regardless of the difference between the two angles 363 and 373, the characteristics information transmitted from the mobile computing devices 360 and 370 is recognized by the server computing device as being associated with the same trigger. This enables the server computing device to match the characteristic information received from the mobile computing devices 360 and 370 to the same signature and the same augmented reality. For some embodiments, markerless tracking may be used to create virtual models of a real world object based on different angles and orientation, as will be described.

For some embodiments, the first user may control the experiences that the second user and any other additional users may have to accept. The first user may establish a new trigger, associate that trigger with a particular game or video, and create a new augmented reality. The first user may control the settings associated with the augmented reality. For example, the settings may include privacy settings, age limit setting, open sharing setting, invitation only setting, etc. The subsequent users will see that the trigger has already been registered and can be invited to join the augmented reality.

Figure 3D:
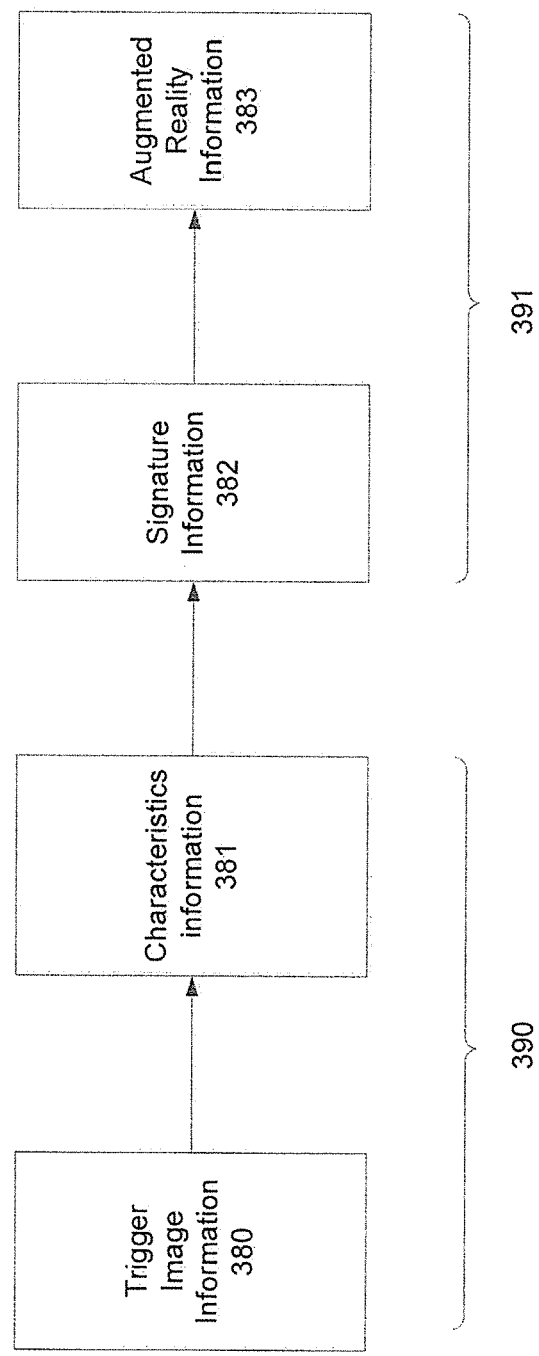
FIG. 3D is a block diagram that illustrates the example mapping of the information from the trigger to the augmented reality, in accordance with some embodiments.

FIG. 3D is a block diagram that illustrates the example mapping of the information from the trigger to the augmented reality, in accordance with some embodiments. As an image or a video stream that includes an image of the trigger is captured, trigger image information 380 may be generated by the image capturing application 305 of a mobile computing device. The image processing application 310 of the mobile computing device may use the trigger image information 380 to generate the characteristics information 381. The characteristics information 381 may then be transmitted from the mobile computing device to the server computing device. Based on receiving the characteristics information from the mobile computing device, the signature information 382 may be generated, by a server computing device. The signature information 382 may then be used by the server computing device to identify the appropriate augmented reality. FIG. 3D also illustrates that the information in the group 390 is generated in the mobile computing device while the information in the group 391 is generated or processed by the server computing device, in some embodiments. Although the signatures are described herein in as being generated by the server computing device, it is possible that the signatures from the plurality of triggers may be computed by the mobile computing device in some embodiments when bandwidth efficiencies may lean toward the mobile computing device.

Figure 4:
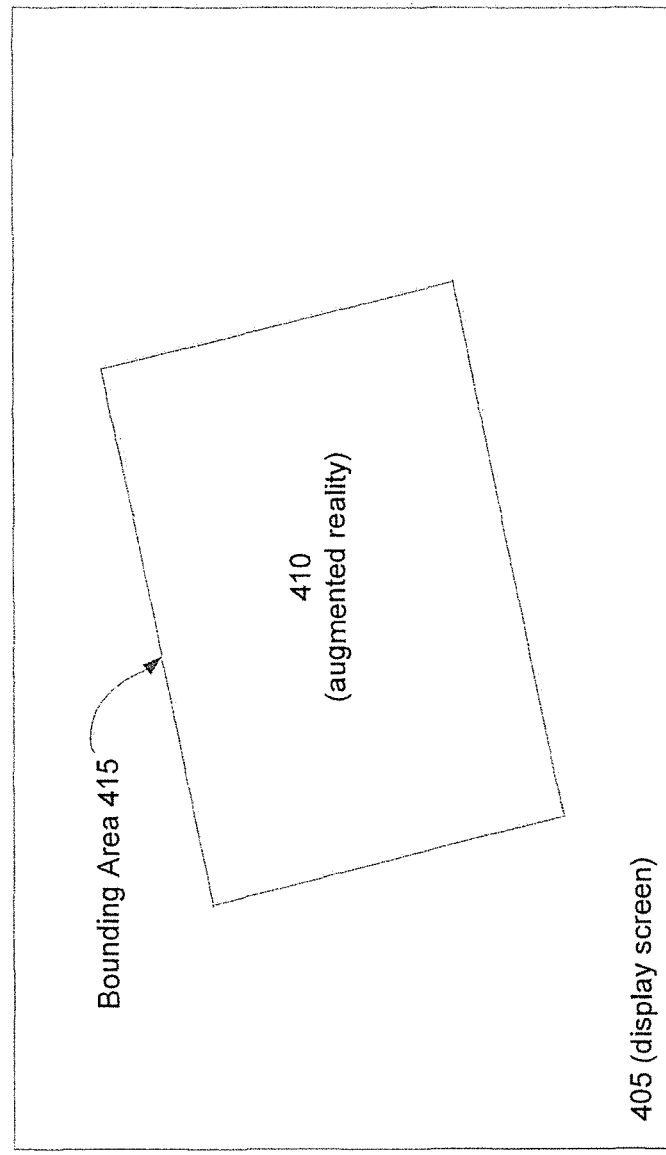
FIG. 4 illustrates an example display screen of a mobile computing device, in accordance with some embodiments of the invention.

FIG. 4 illustrates an example display screen of a mobile computing device, in accordance with some embodiments. Display screen 405 may correspond to the display screen 361 of the mobile computing device 360 illustrated in FIG. 3C, and the bounding area 415 may correspond to the bounding area 345 illustrated in FIG. 3C. In some embodiments, the augmented reality 410 is presented to a user within the bounding area 415 of the display screen 405. It may be noted that, depending on an angle of the video camera relative to the trigger when an image of the trigger is captured, the position of the bounding area 415 may vary within the display screen 405.

For some embodiments, a list of predetermined triggers may be presented to the user of the mobile computing device. The list may also include the augmented realities that correspond to each of the triggers in the list. The list of predetermined triggers may be classified into related groups. For example, the triggers may be grouped into channels, categories, brands, etc. The list of predetermined triggers may be stored in the trigger information database 510 (illustrated in FIG. 5). This may help the users to easily and quickly select triggers that are relevant to their needs, and then use the mobile computing devices as the interface to control their experiences.

Trigger Recognition Network

Figure 5:
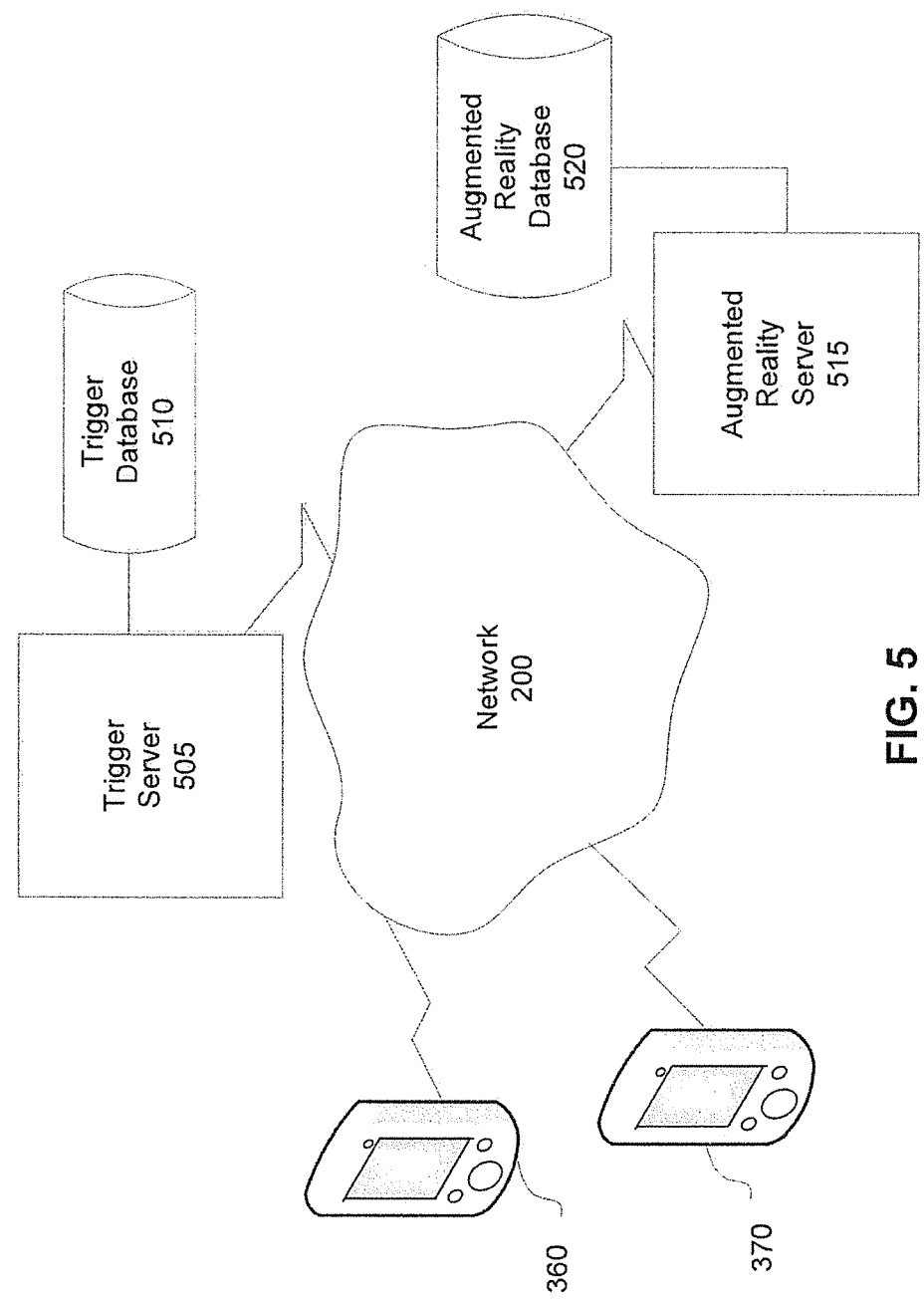
FIG. 5 illustrates an example of network of server computing devices that may be used to identify the augmented realities, in accordance with some embodiments.

FIG. 5 illustrates an example of network of server computing devices that may be used to identify the augmented realities, in accordance with some embodiments. The network may include trigger server 505, augmented reality server 515, and mobile computing devices 360 and 370. In this example, the users of the mobile computing devices 360, 370 may participate in the same augmented reality and may have used the video camera 362, 372 to capture an image or a video stream that includes an image of a trigger. The trigger database 510 may be configured to store information about the registered triggers. The trigger server 505 may be coupled with trigger database 510 and configured to transmit trigger information to the mobile computing devices 360, 370. This may include a list of predetermined triggers grouped into channels, categories, menus, etc. The trigger server 505 may also be configured to receive characteristics information from the mobile computing devices 360, 370. The characteristics information may be associated with the trigger captured by the video camera 362, 372. As mentioned, the mobile computing devices 360, 370 may be connected to the network 200 using wireless communication.

For some embodiments, the trigger server 505 may analyze the characteristics information and determine signature information associated with the characteristics information. The signature information may then be used by the augmented reality server 515 to identify a corresponding augmented reality stored in the augmented reality database 520. The identified augmented reality may then be retrieved, transmitted to the mobile computing devices 360, 370 and presented within the bounding boxes on the display screens 361, 371 of the mobile computing devices 360, 370. For some embodiments, the GPS information may also be transmitted by the mobile computing device along with the characteristics information. Time information related to when the corresponding image or the video stream is captured may also be transmitted by the mobile computing device. The GPS information and/or time information may be used by the augmented reality server 515 to quickly search for and identify the desired augment reality. It may be noted that the although the example illustrates the trigger server 505 and the augmented reality server 515 as two separate server computing devices, the arrangement is scalable such that it is possible that some or all of their operations may be combined into one server computing device. It may also be possible that there may be multiple dedicated trigger servers 505 and multiple dedicated augmented reality servers 515.

For some embodiments, the augmented reality database 520 may be configured to store information that is generated using markerless tracking. An image or a video of a three-dimensional model of a real-world object may be supplied by an image sensor or captured using the video camera of the mobile computing device. The data from the image (also referred to as sensor data) may be used to generate different possible virtual data sets using an augmented reality simulation application. The augmented reality simulation application may be an application included in the augment reality server 515. It may be configured to process interactions between the three dimensional model of the real-world object and a model of a virtual object using markerless tracking to perform tracking and recognition of the real environment without using any special placed markers, where the markerless tracking generates a large number of on-the-fly generated possible virtual sensor datasets with the augmented reality simulation application estimating the trajectory of an object in the image plane as it moves around a scene and then selects the virtual dataset which is most similar with the captured one for getting the current configuration in reality and displaying the augmented reality scenario based on the position and orientation view point of that video camera. The augmented reality simulation engine brings the characteristics of the real-world 3D object including its depth, image, and lighting characteristics inside the augmented reality processing system and treated in a similar manner to virtual objects in the augmented reality environment. In other words, a tracker assigns consistent labels to the tracked objects in different frames of a video. Additionally, depending on a tracking domain, a tracker can also provide object-centric information, such as orientation, area, or shape of an object.

For some embodiments, the trigger server 505 and the augmented reality server 515 may be implemented as an Intelligent Data Operating Layer (IDOL) server using the IDOL application—a software product of Autonomy Corporation of San Francisco, Calif. Other software and systems associated with the IDOL application may also be used. The IDOL application collects indexed data from connectors from various sources to train the engines and stores it in its proprietary structure, optimized for fast processing and retrieval of data. As the information processing layer, the IDOL application forms a conceptual and contextual understanding of all content in an enterprise, automatically analyzing any piece of information from over thousands of different content formats and even people's interests. Hundreds of operations can be performed on digital content by the IDOL application, including hyperlinking, agents, summarization, taxonomy generation, clustering, education, profiling, alerting and retrieval.

Figure 9:
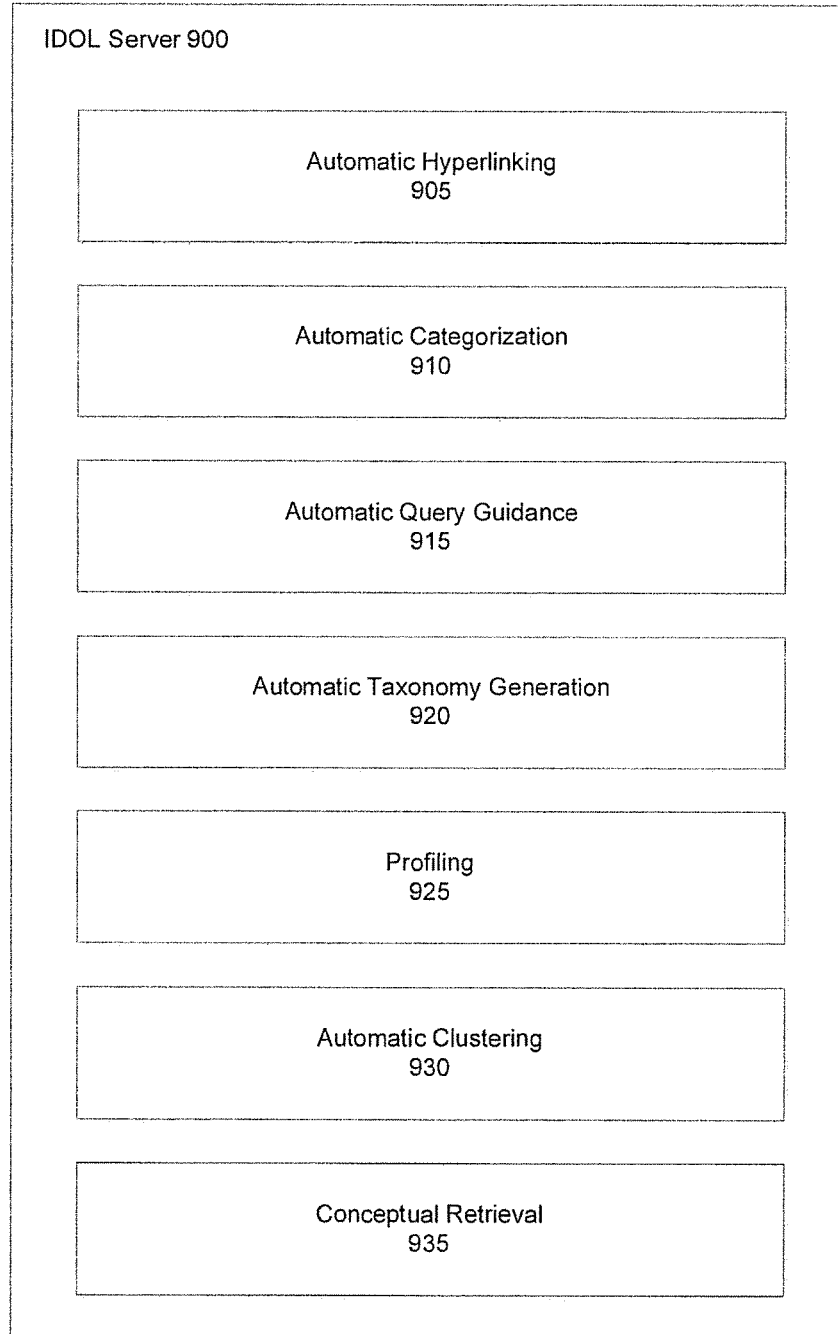
FIG. 9 illustrates an example block diagram of some modules of an IDOL server, in accordance with some embodiments.

The IDOL application has a knowledge base of concept information and is able to inter-relate the characteristics information of the triggers with the signatures and the corresponding augmented realities. An example of the modules included in the IDOL application is illustrated in FIG. 9.

The IDOL application enables organizations to benefit from automation without losing manual control. This complementary approach allows automatic processing to be combined with a variety of human controllable overrides, offering the best of both worlds and never requiring an "either/or" choice. The IDOL application integrates with all known legacy systems, eliminating the need for organizations to cobble together multiple systems to support their disparate component.

The IDOL application may be associated with an IDOL connector which is capable of connecting to hundreds of content repositories and supporting over thousands of file formats. This provides the ability to aggregate and index any form of structured, semi-structured and unstructured data into a single index, regardless of where the file resides. The extensive set of connectors enables a single point of search for all enterprise information (including rich media), saving organizations much time and money. With access to virtually every piece of content, the IDOL application provides a 360 degree view of an organization's data assets.

The IDOL application implements a conceptual technology, is context-aware, and uses deep audio and video indexing techniques to find the most relevant products, including music, games and videos. The IDOL application categorizes content automatically to offer intuitive navigation without manual input. The IDOL application also generates links to conceptually similar content without the user having to search. The IDOL application may be trained with free-text descriptions and sample images such as a snapshot of a product. A business console presents live metrics on query patterns, popularity, and click-through, allowing the operators to configure the environment, set-up promotions and adjust relevance in response to changing demand.

Mirroring and Distributed Processing

Referring to FIG. 5, in some embodiments, there may be many trigger servers 505 and augmented reality servers 515 to accommodate the demand and usage by many users sharing many different augmented realities. For example, at a first site, there may be one or more trigger servers 505 and augmented reality servers 515. Further, there may be multiple mirrored sites, each having similar hardware and software configuration and set up as the first site. The multiple sites may collaborate with one another in a distributed manner to help speed up the analysis of the characteristics information so that the augmented reality may be identified and transmitted to the mobile computing devices in real time or near real time. This may enable users to quickly and casually join an on-going augmented reality.

Flow Diagrams

Figure 6:
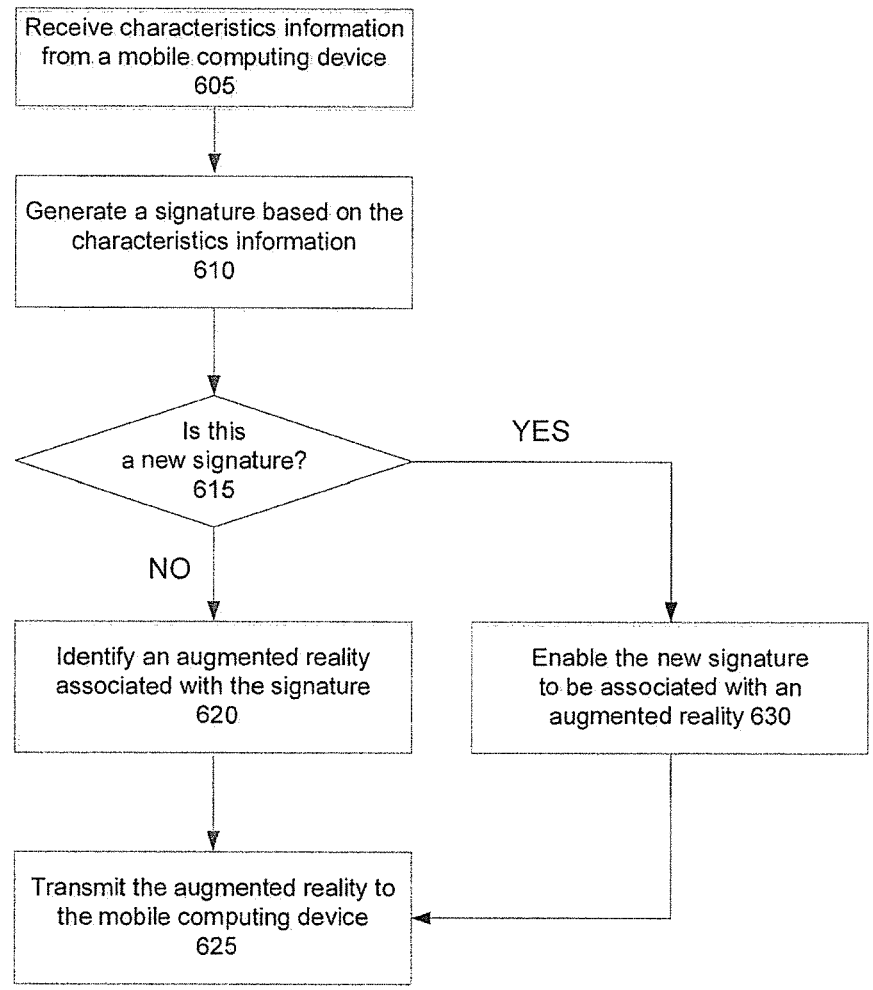
FIG. 6 illustrates an example flow diagram of a process that may be performed by one or more server computing devices, in accordance with some embodiments of the invention.

FIG. 6 illustrates an example flow diagram of a process that may be performed by one or more server computing devices, in accordance with some embodiments. For example, the one or more server computing devices may include the trigger server and the augmented reality server described in FIG. 5. At block 605, the characteristics information is received from a mobile computing device. The characteristics information may be associated with a trigger. At block 610, the server computing devices use the characteristics information to generate signature information. At block 615, a test is performed to determine whether the signature is a new signature that the server computing devices have not seen before. When that is a new signature, at block 630, then the server computing devices may identify an augmented reality to associate the signature with. It may be possible that a user of the mobile computing device may have already been presented with a list of registered triggers as well as a list of the related augmented reality identifiers, and the user may decide to create a new trigger to go with one of the existing augmented reality identifier. As such, this information may be available to the server computing device to enable matching the new signature with an existing augmented reality. At block 625, the identified augmented reality is transmitted to the mobile computing device. Alternatively, from block 615, the signature may not be a new signature. This may occur when the user uses a trigger that has previously been registered and known to the server computing device. In this situation, the augmented reality is identified, as shown in block 620, and transmitted to the mobile computing device, as shown in block 625.

The operations described in blocks 605-625 may be stored as instructions on a computer-readable media. The instructions may include transmitting the characteristics information of a trigger to a server computing device connected to a network using wireless communication, receiving an augmented reality corresponding to the characteristics information of the trigger from the server computing device, and enabling the augmented reality to be displayed within a bounding area of a display screen of a first mobile computing device, wherein the augmented reality associated with the first mobile computing device is shared and time synchronized with an augmented reality previously transmitted by the server computing device to a second mobile computing device, the second mobile computing device having previously transmitted characteristic information of the same trigger to the server computing device, and wherein the first and second mobile computing device are located within a close proximity of one another.

Figure 7:
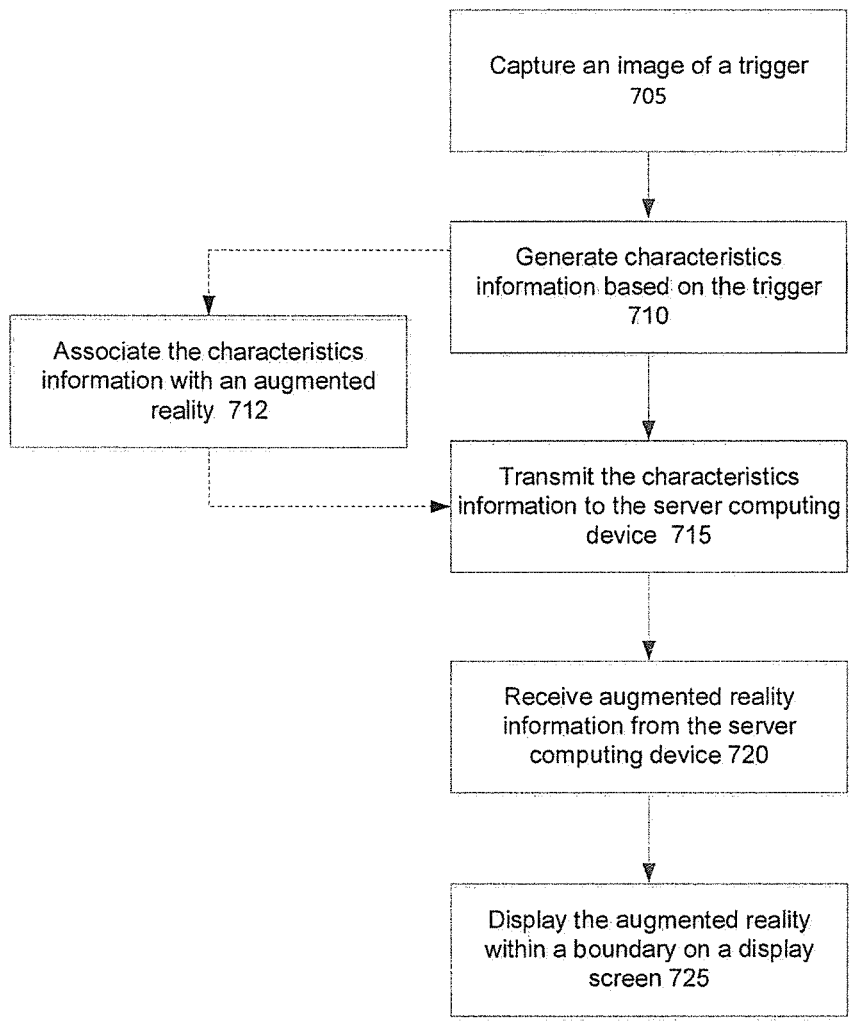
FIG. 7 illustrates an example flow diagram of a process that may be performed by a mobile computing device, in accordance with some embodiments of the invention.

FIG. 7 illustrates an example flow diagram of a process that may be performed by a mobile computing device, in accordance with some embodiments. At block 705, an image of the trigger is captured using the video camera of the mobile computing device. At block 710, the characteristics information of the trigger is generated. At block 715, the characteristics information is transmitted to the server computing devices. The server computing devices may include the trigger server and the augmented reality server described in FIG. 5. The server computing devices may analyze the characteristics information, generate signature information, and identify the appropriate augmented reality information. At block 720, the augmented reality information is received from the server computing devices. At block 725, the augmented is display within a boundary area of the display screen of the mobile computing device. The above process may be applicable to a situation when an image of a registered trigger is captured. As additional users want to join in on the experience, the operations in blocks 705-725 may be repeated for each new user.

In a situation when a new trigger is used, the process may flow from block 710 to block 712 where the characteristics information may be associated with an augmented reality identifier. The process then continues at block 715 where both the characteristics information and the augmented reality identifier are transmitted to the server computing devices.

Figure 8:
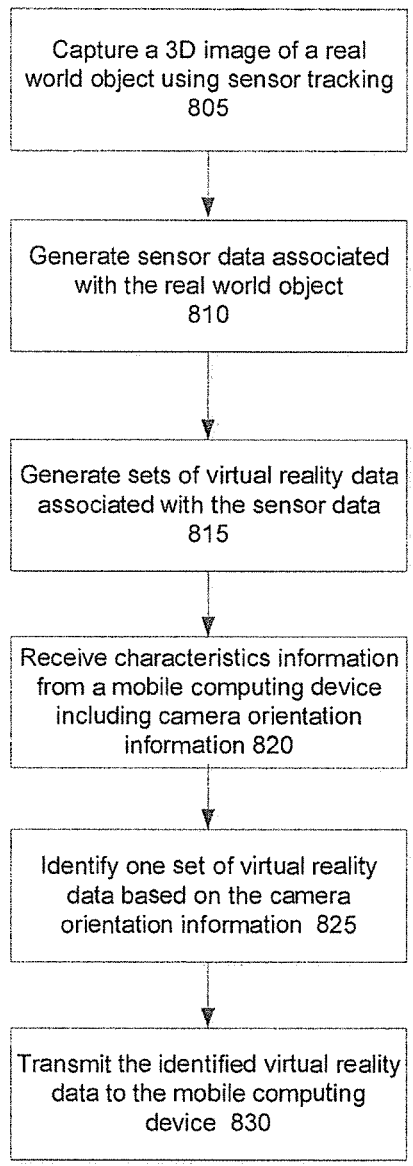
FIG. 8 illustrates an example flow diagram of a process that may be performed using markerless tracking and by one or more server computing devices, in accordance with some embodiments.

FIG. 8 illustrates an example flow diagram of a process that may be performed using markerless tracking and by one or more server computing devices, in accordance with some embodiments. In this example, an image of a three-dimensional real world object is captured using sensor tracking, as shown in block 805. At block 810, sensor data is generated based on the image. At block 815, multiple sets of virtual reality data is generated based on the sensor data. These sets of virtual reality data may correspond to different variations of the sensor data based on changes in angles, orientation as simulated by an augmented reality simulation application. The sets of virtual reality data may be stored in the augmented reality database 515, shown in FIG. 5. At block 820, the characteristics information is received from a mobile computing device. Orientation information may also be received. At block 825, signature information may be generated, and a set of virtual reality data may be identified based on the signature information and the orientation information. At block 830, the virtual reality data is transmitted to the mobile computing device. This virtual reality data corresponds to the augmented reality that is to be presented on the display screen of the mobile computing device. For some embodiments, the operations in blocks 805-815 may only need to be performed once for a particular three-dimensional real world object. As additional users want to join in on the experience, the operations in blocks 820-830 may be repeated for each new user.

Intelligent Data Operating Layer (IDOL) Server

FIG. 9 illustrates an example block diagram of some modules of an IDOL server, in accordance with some embodiments. IDOL server 900 may include automatic hyperlinking module 905, automatic categorization module 910, automatic query guidance module 915, automatic taxonomy generation module 920, profiling module 925, automatic clustering module 930, and conceptual retrieval module 935. The automatic hyperlinking module 905 is configured to allow manual and fully automatic linking between related pieces of information. The hyperlinks are generated in real-time at the moment the document is viewed. The automatic categorization module 910 is configured to allow deriving precise categories through concepts found within unstructured text, ensuring that all data is classified in the correct context.

The automatic query guidance module 915 is configured to provide query suggestions to find most relevant information. It identifies the different meanings of a term by dynamically clustering the results into their most relevant groupings. The automatic taxonomy generation module 920 is configured to automatically generate taxonomies and instantly organizes the data into a familiar child/parent taxonomical structure. It identifies names and creates each node based on an understanding of the concepts with the data set as a whole. The profiling module 925 is configured to accurately understand individual's interests based on their browsing, content consumption and content contribution. It generates a multifaceted conceptual profile of each user based on both explicit and implicit profiles.

The automatic clustering module 930 is configured to help analyze large sets of documents and user profiles and automatically identify inherent themes or information clusters. It even cluster unstructured content exchanged in emails, telephone conversations and instant messages. The conceptual retrieval module 935 is configured to recognize patterns using a scalable technology that recognizes concepts and find information based on words that may not be located in the documents.

It should be noted that the IDOL server 900 may also include other modules and features that enable it to analyze the characteristics information received from the mobile computing devices and to identify the augmented reality stored in the augmented reality database 520 (illustrated in FIG. 5).

Computing System

FIG. 1 illustrates a block diagram of an example computing system that may use an embodiment of one or more of the software applications discussed herein. The computing system environment 100 is only one example of a suitable computing environment, such as a client device, and is not intended to suggest any limitation as to the scope of use or functionality of the design. Neither should the computing environment 100 be interpreted as having any dependency or requirement relating to any one or combination of components illustrated in the exemplary operating environment 100.

The design is operational with numerous other general purpose or special purpose computing system environments or configurations. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The design may be described in the general context of computing device executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine readable media discussed below.

The design may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary computing type system for implementing the design includes a general-purpose computing device in the form of a computing device 110. Components of computing device 110 may include, but are not limited to, a processing unit 120 having one or more processing cores, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus.

Computing device 110 typically includes a variety of computing machine readable media. Computing machine readable media can be any available media that can be accessed by computing device 110 and includes both volatile and non-volatile media, removable and non-removable media. By way of example, and not limitation, computing machine readable mediums uses include storage of information, such as computer readable instructions, data structures, program modules or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules, or other transport mechanism and includes any information delivery media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computing device 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing device 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computing device 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor or display 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing device 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computing device 110. The logical connections depicted in FIG. 1 include a local area network (LAN) 171 and a wide area network (WAN) 173, but may also include other networks. Such networking environments are commonplace in offices, enterprise-wide computer networks, intranets and the Internet. A browser application may be resident on the computing device and stored in the memory.

When used in a LAN networking environment, the computing device 110 is connected to the LAN 171 through a network interface or adapter 170. When used in a WAN networking environment, the computing device 110 typically includes a communication module 172 or other means for establishing communications over the WAN 173, such as the Internet. The communication module 172 may be a modem used for wired, wireless communication or both. The communication module 172 may be internal or external, may be connected to the system bus 121 via the user-input interface 160, or other appropriate mechanism. In a networked environment, program modules depicted relative to the computing device 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present design can be carried out on a computing system such as that described with respect to FIG. 1. However, the present design can be carried out on a server, a computer devoted to message handling, or on a distributed system in which different portions of the present design are carried out on different parts of the distributed computing system.

Another device that may be coupled to bus 111 is a power supply such as a battery and Alternating Current adapter circuit. As discussed above, the DC power supply may be a battery, a fuel cell, or similar DC power source that needs to be recharged on a periodic basis. For wireless communication, the communication module 172 may employ a Wireless Application Protocol to establish a wireless communication channel. The communication module 172 may implement a wireless networking standard such as Institute of Electrical and Electronics Engineers (IEEE) 802.11 standard, IEEE std. 802.11-1999, published by IEEE in 1999.

While other systems may use, in an independent manner, various components that may be used in the design, a comprehensive, integrated system that addresses the multiple advertising system points of vulnerability described herein does not exist. Examples of mobile computing devices may be a laptop computer, a cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

Network Environment

Figure 2:
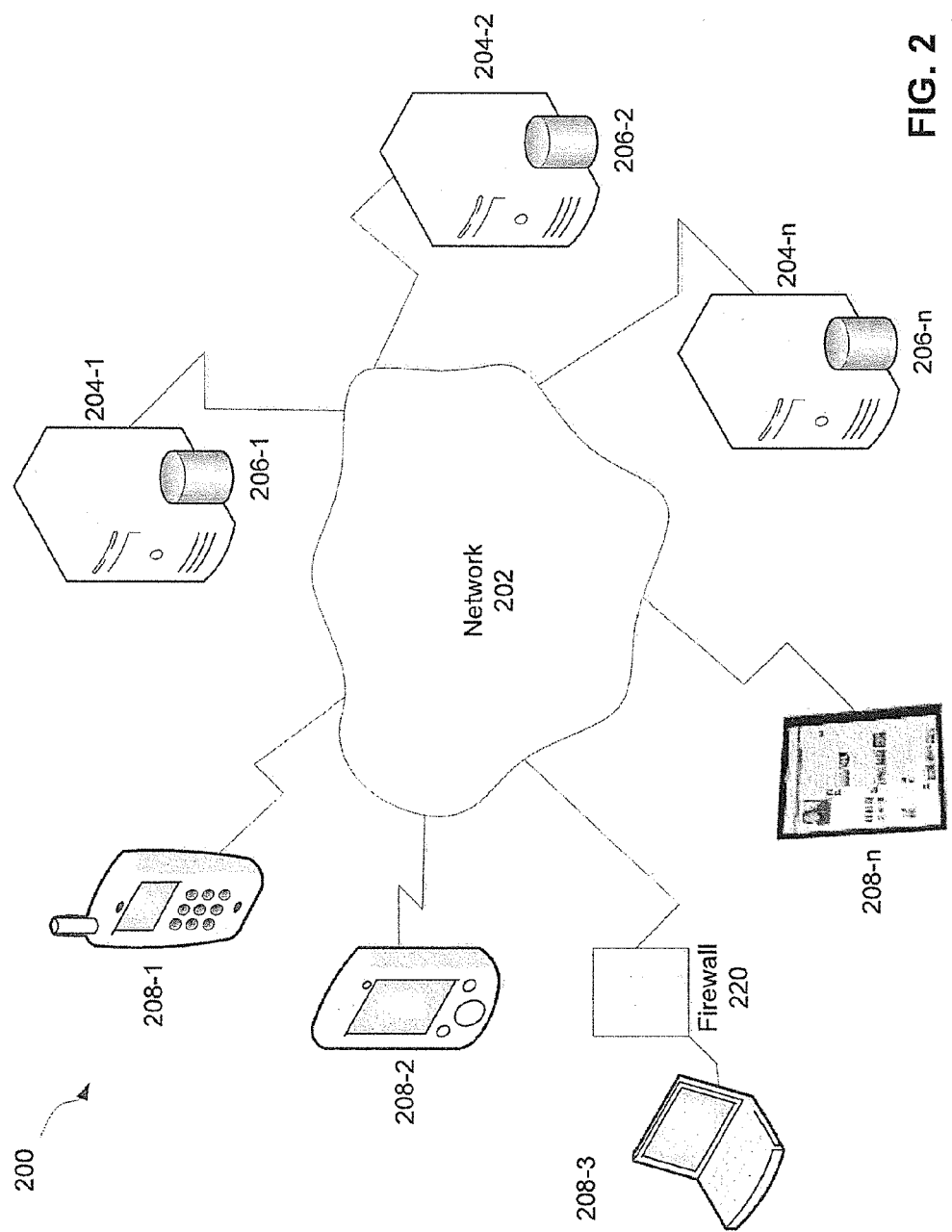
FIG. 2 illustrates an example of a network that may be used with embodiments of the invention.

FIG. 2 illustrates a network environment 200 in which the techniques described may be applied. The network environment 200 has a network 202 that connects server computing devices 204-1 through 204-n, and at least one or more client computing systems 208-1. As shown, there may be many server computing devices 204-1 through 204-n and many client computing systems 208-1 through 208-n connected to each other via a network 202, which may be, for example, the Internet. Note, that alternatively the network 202 might be or include one or more of: an optical network, the Internet, a Local Area Network (LAN), Wide Area Network (WAN), satellite link, fiber network, cable network, or a combination of these and/or others. It is to be further appreciated that the use of the terms client computing system and server computing device is for clarity in specifying who initiates a communication (the client computing system) and who responds (the server computing device). No hierarchy is implied unless explicitly stated. Both functions may be in a single communicating device, in which case the client-server and server-client relationship may be viewed as peer-to-peer. Thus, if two systems such as the client computing system 208-1 and the server computing device 204-1 can both initiate and respond to communications, their communication may be viewed as peer-to-peer. Likewise, communications between the client computing systems 204-1 and 204-2 and the server computing devices 208-1 and 208-2 may be viewed as peer-to-peer if each such communicating device is capable of initiation and response to communication. One or more of the server computing devices 204-1 to 204-n may be associated with a database such as, for example, the databases 206-1 to 206-n. A firewall such as, for example, the firewall 220 may be established between a client computing system 208-3 and the network 202 to protect data integrity on the client computing system 208-3.

FIG. 2 also illustrates a block diagram of an embodiment of a server computing device to display information, such as a web page, etc. The application such as, for example, a signature generation application to identify and match with possible augmented reality, when executed on the server computing device 204-1, causes the server computing device 204-1 to display windows and user interface screens on a portion of a media space, such as a web page. A user via a browser from the client computing system 208-1 may interact with the web page, and then supply input to the query/fields and/or service presented by a user interface of the application. The web page may be served by a web server computing device 204-1 on any Hypertext Markup Language (HTML) or Wireless Access Protocol (WAP) enabled client computing system 208-1 or any equivalent thereof. For example, the client mobile computing system 208-1 may be a smart phone, a touch pad, a laptop, a net book, etc. The client computing system 208-1 may host a browser to interact with the server computing device 204-1. Each application, widget, plug-in, etc. has a code scripted to perform the functions that the software component is coded to carry out such as presenting fields and icons to take details of desired information. The applications may be hosted on the server computing device 204-1 and served to the browser of the client computing system 208-1. The applications then serve pages that allow entry of details and further pages that allow entry of more details.

Any application and other scripted code components may be stored on a computing machine readable medium which, when executed on the server causes the server to perform those functions. In an embodiment, the software used to facilitate the functions and processes described herein can be embodied onto a computing machine readable medium such as computer readable medium. As discussed above a computing machine readable medium includes any mechanism that provides (e.g., stores) information in a form readable by a machine (e.g., a computer). For example, a computing machine readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions. The information representing the apparatuses and/or methods stored on the computing machine readable medium may be used in the process of creating the apparatuses and/or methods described herein.

The present designs also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled with a computing system bus. Portions of any modules or components described herein may be implemented in lines of code in software, configured logic gates in software, or a combination of both, and the portions implemented in software are tangibly stored on a computer readable storage medium.

The algorithms and displays presented herein are not inherently related to any particular computer or other apparatus. Various general purpose systems may be used with programs in accordance with the teachings herein, or it may prove convenient to construct more specialized apparatus to perform the required method blocks. The required structure for a variety of these systems will appear from the description below.

Some portions of the detailed descriptions disclosed herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as C, C++, Java, or other similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computing system, or similar electronic computing device, that manipulates and transforms data represented as physical (electronic) quantities within the computing system's registers and memories into other data similarly represented as physical quantities within the computing system memories or registers, or other such information storage, transmission or display devices.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. For example, specific examples are provided for shapes and materials; however, embodiments include those variations obvious to a person skilled in the art, such as changing a shape or combining materials together. Further, while some specific embodiments of the invention have been shown the invention is not to be limited to these embodiments. For example, several specific modules have been shown. Each module performs a few specific functions. However, all of these functions could be grouped into one module or even broken down further into scores of modules. Most functions performed by electronic hardware components may be duplicated by software emulation and vice versa. The invention is to be understood as not limited by the specific embodiments described herein, but only by scope of the appended claims.

What is claimed is:

1. A computer comprising:
   a processor; and
   a memory on which is stored machine readable instructions that are to cause the processor to:
      receive characteristics information of an object in an image captured by a first computing device;
      generate a signature based on the characteristics information by accessing a database of triggers;
      identify an augmented reality information associated with the signature by accessing a database of augmented reality scenarios;
      transmit the augmented reality information to the first computing device;
      receive, from a second computing device, a set of characteristics information of the object in an image captured by the second computing device;
      determine that the set of characteristics information from the second computing device has a second signature that matches the signature generated based on the characteristics information received form the first computing device; and
      transmit the identified augmented reality information to the second computing device.

2. The computer according to claim 1, wherein the machine readable instructions are further to cause the processor to:
   determine a plurality of candidate augmented reality information associated with the signature;
   transmit the plurality of candidate augmented reality information to the first computing device;
   receive a selection of one of the plurality of candidate augmented reality information from the first computing device; and
   wherein the identified augmented reality associated with the signature comprises the selected one of the plurality of candidate augmented reality information.

3. The computer according to claim 1, wherein the machine readable instructions are further to cause the processor to determine whether the generated signature is a new signature and to associate the generated signature with an augmented reality information in response to a determination that the generated signature is a new signature.

4. The computer according to claim 1, wherein the machine readable instructions are further to cause the processor to transmit the identified augmented reality information in a time synchronized manner to both the first computing device and the second computing device.

5. The computer according to claim 1, wherein the machine readable instructions are further to cause the processor to:
   receive geographic location information of the first computing device and the second computing device;
   determine whether the first computing device and the second computing device are in close proximity to each other based upon the received geographic location information; and
   transmit the identified augmented reality information to the second computing device in response to a determination that the first computing device and the second computing device are in close proximity to each other.

6. A method for supplying augmented reality information, said method comprising:
   receiving characteristics information of an object in an image captured by a first computing device;
   identifying, by a processor, an augmented reality information associated with the received characteristics information, wherein the received characteristics information corresponds to a trigger and wherein the trigger corresponds to the identified augmented reality information;
   receiving, from the second computing device, a set of characteristics information of the object in an image captured by the second computing device;
   determining that the set of characteristics information from the second computing device are equivalent to the characteristics information received from the first computing device; and
   transmitting the identified augmented reality information to both the first computing device and the second computing device in a time synchronized manner.

7. The method according to claim 6, further comprising:
   determining the trigger corresponding to the received characteristics information.

8. The method according to claim 6, further comprising:
   determining a plurality of candidate augmented reality information associated with the received characteristics information;
   transmitting the plurality of candidate augmented reality information to the first computing device;
   receiving a selection of one of the plurality of candidate augmented reality scenarios from the first computing device; and
   wherein transmitting the augmented reality scenario further comprises transmitting the selected one of the plurality of candidate augmented reality information.

9. The method according to claim 6, wherein transmitting the identified augmented reality information to both the first computing device and the second computing device further comprises transmitting the identified augmented reality information to both the first computing device and the second computing device to cause the identified augmented reality information to be displayed synchronously on the first computing device and the second computing device.

10. The method according to claim 6, further comprising:
receiving geographic location information of the first computing device and the second computing device;
determining whether the first computing device and the second computing device are in close proximity to each other based upon the received geographic location information; and
wherein transmitting the identified augmented reality information to the first computing device and the second computing device further comprises transmitting the identified augmented reality information to the first computing device and the second computing device in response to a determination that the first computing device and the second computing device are in close proximity to each other.

11. A non-transitory computer readable storage medium on which is stored machine readable instructions that when executed by a processor cause the processor to:
receive characteristics information of an object in an image displayed on a first computing device;
identify an augmented reality information associated with the received characteristics information, wherein the received characteristics information corresponds to a trigger and wherein the trigger corresponds to the identified augmented reality information;
receive, from a second computing device, a set of characteristics information of the object in an image captured by the second computing device;
determine that the set of characteristics information from the second computing device is equivalent to the characteristics information received from the first computing device; and
transmit the identified augmented reality information to both the first computing device and the second computing device in a time synchronized manner.

12. A computer comprising:
a processor; and
a memory on which is stored machine readable instructions that are to cause the processor to:
receive characteristics information of an object in an image captured by a first computing device;
generate a signature based on the characteristics information;
determine whether the generated signature is a new signature;
associate the generated signature with an augmented reality information in response to a determination that the generated signature is a new signature;
transmit the augmented reality information to the first computing device;
receive, from a second computing device, a set of characteristics information of the object in an image captured by the second computing device;
determine that the set of characteristics information from the second computing device has a second signature that matches the signature generated based on the characteristics information received form the first computing device; and
transmit the identified augmented reality information to the second computing device.

13. A computer comprising:
a processor; and
a memory on which is stored machine readable instructions that are to cause the processor to:
receive characteristics information of an object in an image captured by a first computing device;
generate a signature based on the characteristics information;
identify an augmented reality information associated with the signature;
transmit the augmented reality information to the first computing device;
receive, from a second computing device, a set of characteristics information of the object in an image captured by the second computing device;
determine that the set of characteristics information from the second computing device has a second signature that matches the signature generated based on the characteristics information received form the first computing device;
receive geographic location information of the first computing device and the second computing device;
determine whether the first computing device and the second computing device are in close proximity to each other based upon the received geographic location information; and
transmit the identified augmented reality information to the second computing device in response to a determination that the first computing device and the second computing device are in close proximity to each other.

14. A non-transitory computer readable storage medium on which is stored machine readable instructions that when executed by a processor cause the processor to:
receive characteristics information of an object in an image displayed on a first computing device;
generate a signature based on the characteristics information by accessing a database of triggers;
identify an augmented reality information associated with the signature by accessing a database of augmented reality scenarios;
transmit the augmented reality information to the first computing device;
receive, from a second computing device, a set of characteristics information of the object in an image captured by the second computing device;
determine that the set of characteristics information from the second computing device has a second signature that matches the signature generated based on the characteristics information received form the first computing device; and
transmit the identified augmented reality information to the second computing device.

* * * * *